United States Patent

[11] 3,601,899

| [72] | Inventor | Mahlon R. Artz |
| --- | --- | --- |
| | | Nashua, N.H. |
| [21] | Appl. No. | 838,942 |
| [22] | Filed | July 3, 1969 |
| [45] | Patented | Aug. 31, 1971 |
| [73] | Assignee | The United States of America as represented by the Secretary of the Navy |

[54] SINGLE CORE SOLID-STATE COMPASS
4 Claims, 1 Drawing Fig.

[52] U.S. Cl. .................................................. 33/222,
307/314, 324/43
[51] Int. Cl. .................................................. G01c 17/28
[50] Field of Search .................................. 33/204.43,
204.44, 204 FA, 204 GB; 324/43

[56] References Cited
UNITED STATES PATENTS

| 2,389,146 | 11/1945 | Fragola et al. ................ 33/204 (.43) X |
| 3,040,248 | 6/1962 | Geyger ........................ 324/43 |

FOREIGN PATENTS

| 1,087,980 | 10/1967 | Great Britain ................ 324/43 |
| 98,414 | 3/1940 | Sweden ........................ 33/204 (.43) |

Primary Examiner—Robert B. Hull
Attorneys—E. J. Brower, Arthur L. Branning, T. O. Watson and R. R. Anderson ABSTRACT: A compass with no moving parts, the sensing element consisting of four coils equally spaced around a single toroidal core. Diametrically opposite coils are connected to opposite sides of a center-tapped transformer so that in the absence of an external magnetic field the signals cancel out. The presence of an external magnetic field will then unbalance the coils and produce a directional signal.

PATENTED AUG 31 1971   3,601,899
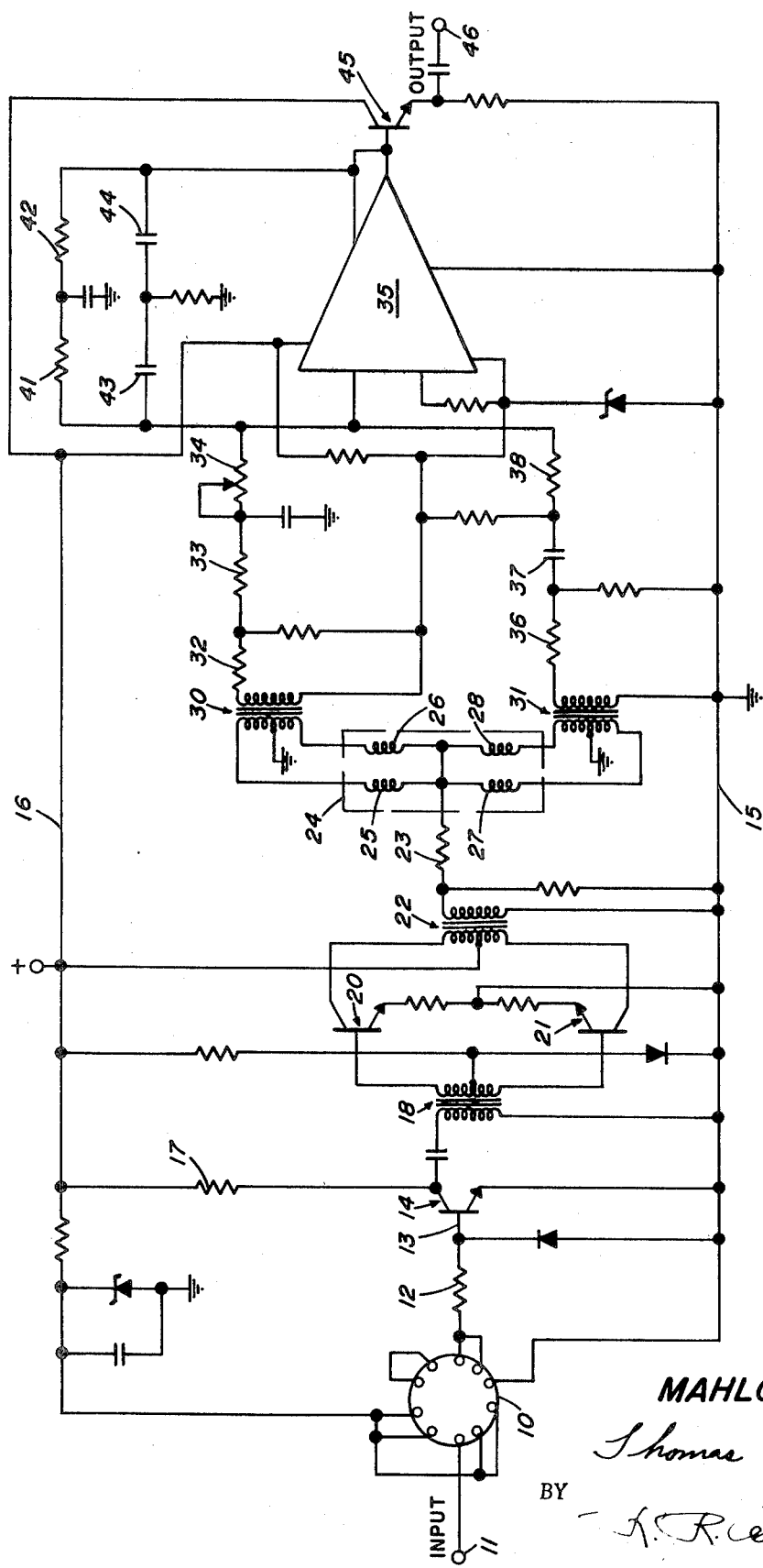
INVENTOR
MAHLON R. ARTZ
Thomas O. Watson Jr.
BY
ATTORNEY
K. R. Anderson
AGENT

SINGLE CORE SOLID-STATE COMPASS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Field of the Invention

The present invention relates to compasses for determining magnetic direction and more particularly to compasses which have no moving parts.

Compasses may take many forms, varying in range from those of the early days of navigation, which consisted merely of a pivoted magnet which would respond to the earth's magnetic field to give direction, all the way to the present day sophisticated models having a plurality of electromagnetic coils producing signals for multiple remote indicating stations. Probable the most often used of the present day models is the goniometer. This is an instrument for measuring angles and is used to calculate and resolve mathematical problems or electrical functions, as well as to establish directional phase difference between two transmitted or received signals. Usually, it has two fixed windings crossed at 90° to each other along with a rotatable third winding. Navigational directions are indicated by these instruments through the provision of electrical signals of phase and magnitude as determined by the difference between the fields of the coils themselves and the earth's magnetic field.

While the goniometer may be an effective, modern day instrument, it nevertheless does have a number of drawbacks which would be conducive to further improvement. For example, the goniometer has many moving parts and any instrument having moving parts is subject to wear, maladjustment and breakdown. It also has a multiple sensing element composed of the plurality of coils which must be accurately maintained in a definite position relative to one another. The alignment and balance of these multiple sensing elements is a continuing source of difficulty and often requires frequent and extended services for highly trained technical personnel.

SUMMARY OF THE INVENTION

The present invention offers a number of improvements in the compass art in that it has no moving parts to wear and break down, and also since the sensing element is a single unit only a minimum alignment and balance are required.

An object of the invention is the provision of a solid state compass having no moving parts.

Another object of the invention is the provision of a compass in which the sensing element is a single unit.

Still another object of the invention is the provision of a compass which requires only a minimum adjustment and balance of the element.

Yet another object of the invention is the provision of a compass which has multiple coils placed on a single core.

Other objects and many of the attendant advantages of the present invention will readily become apparent as the same becomes better understood by reference to the following detailed description when considered in connection with the accompanying drawings in which like reference numerals designate like parts throughout the figures thereof.

BRIEF DESCRIPTION OF DRAWINGS

FIG. 1 shows a schematic diagram of the compass.

DESCRIPTION OF PREFERRED EMBODIMENTS

Referring now to FIG. 1 of the drawing, there is shown an input terminal 11 for receiving a driving signal, this signal then being applied through frequency divider 10 and a series resistance 12 to the base 13 of an NPN transistor 14. The emitter of the transistor 14 is connected to a ground bus bar 15 while the collector receives potential from a positive bus bar 16 by a series connected resistor 17. The collector of transistor 14 is also connected to the primary of a transformer 18, this transformer having a center-tapped secondary winding the outer connections of which are tied to the bases of two other NPN transistors 20 and 21. The emitters of transistors 20 and 21 are tied to the ground bus bar 16 while their collectors feed a center-tapped primary of transformer 22 being connected to positive bus bar 16 so that transformer 18, transistors 20 and 21, and transformer 22 act as an amplifier circuit, the operation which will be fully described hereinafter.

The output of transformer 22 is connected to a coupling resistor 23 which in turn is connected to the sensing element 24 shown here as enclosed in dotted lines. The sensing element 24 consists of four coils 25, 26, 27 and 28, all equally spaced around a single toroidal shaped core, the coils being connected essentially in parallel in such a way that the flux from each coil adds to the total flux.

The output produced by the coils of the sensing element 24 is divided to form two signal channels wherein coils 25 and 26 are connected to a center-tapped primary in a transformer 30, and coils 27 and 28 are connected to a center-tapped primary of another transformer 31. Series connected resistors 32 and 33 in one of the signal channels is connected to the output of transformer 30, the output of resistor 33 being connected to a potentiometer 34 whose output is connected to the input of an amplifier 35. In the other signal channel the output of transformer 31 is connected to series resistor 36, capacitance 37, another resistance 38, and this in turn is connected also to amplifier 35. Potentiometer 34 is used to adjust the signal in that signal channel so that its maximum amplitude is exactly equal to the maximum signal amplitude generated by the other signal channel.

Amplifier 35 has a feedback circuit consisting of resistances 41 and 42 connected in parallel with capacitors 43 and 44, this feedback circuit being connected from the output of amplifier 35 back to its input in accordance with standard procedure. The output of amplifier 35 which, in the absence of an external magnetic field, is zero since the two channels balance one another, is connected to an NPN transistor 45 before being applied to an output terminal 46.

Turning now to the operation of the device, it will be seen that the sensing element 24 of the single core compass consists of four coils (25, 26, 27 and 28) equally spaced around a single toroidal shaped core. The coils are connected essentially in parallel and in such a way that the flux from each coil adds to the total flux. A signal at input 11 is reduced to one-half frequency by the frequency divider 10, as is commonly done in the art, and amplified by transistor 14 which drives transistors 20 and 21. The full coils 25, 26, 27 and 28 are driven with square waves supplied by the oscillator circuit of transistors 20 and 21, and the amplitude of this drive is sufficient to saturate the core during the latter portion of the square wave. By design the finite driving impedance and the initial coil reactance do not permit the current to rise immediately to the saturation level, but when the saturation level is reached, the coil impedance very suddenly drops and causes a sharp rise in current and a corresponding fall in voltage.

Coils diametrically opposite each other, such as 25 and 26, or 27 and 28, are connected to the opposite sides of a center-tapped transformer, such as transformer 30 or 31. One such pair of coils such as 25–26 can be designated as the North-South coil pair and the other pair, 27–28, can be designated as the East-West coil pair. The flux of each half of the transformer, such as the primary of transformer 30, will tend to cancel the flux from the other half and the output of the transformer secondary will be the difference between the coils of a pair. In the absence of an external magnetic field and if perfect balance in the coil pair and its corresponding transformer is assumed, there will be no output from the transformer secondary.

If an external magnetic field is present, there will be a component of that field that will pass through a coil pair and influence the flux level at which the drive will cause the coil to saturate. In one coil the point of saturation and, therefore, the resulting pulse of saturating current, will occur sooner than it would have occurred had there not been an external field; and in the other coil of that coil pair the point of saturation will be reached correspondingly later. During the other half of the drive cycle the times of saturation trade places in their currents. However, since the transformer performs an effective subtraction, the same effect is seen at the transformer secondary. The difference in the currents amounts to a series of pulses whose amplitude corresponds to a cosinusoidal function of the direction of the external magnetic field component in the plane of the coil.

The pulses thus created have a predominant component which is the second harmonic of the driving voltage. If the phase of the second harmonic from one coil pair is shifted 90° and added to the second harmonic from the other coil pair, and a filter added to attenuate all other signals except the second harmonic, the phase-angle of this second harmonic can be made to correspond to the direction of the external magnetic field.

From the above description of the structure and operation of the present invention, it is obvious that there is presented a single core solid state compass which offers considerable improvement over prior art compasses. The device has no moving parts to wear out or need adjustment, it has a sensing element which is a single unit which thereby requires a minimum amount of alignment and balance, and one which not only has solid-state components, but all of its coils are wound on a single toroidal core.

Obviously many modifications and variations of the present invention are possible in light of the above teachings. It is therefore to be understood that within the scope of the appended claims the invention may be practiced otherwise than as specifically described.

What is claimed is:

1. A compass comprising:
   a sensing element consisting of four coils equally spaced around a single toroidal core; the four coils connected essentially in parallel whereby the flux from each coil adds to the total flux;
   means for applying a square wave to the sensing element;
   means connected to the coils to pickoff any output generated by the coils; and
   amplifying means connected to the pickoff means.

2. The compass of claim 1 wherein the pickoff means is two center-tapped transformers, one being connected to the North-South coil pair and the other being connected to the East-West coil pair.

3. The compass of claim 2 wherein, in the presence of an external magnetic field, the output of each coil pair is a pulse whose amplitude corresponds to a cosinusoidal function of the direction of the external magnetic field.

4. The compass of claim 3 wherein the output of one coil pair is shifted 90° and added to the output of the other coil pair to produce a signal corresponding to the direction of the external magnetic field.